United States Patent
Lee

(10) Patent No.: US 10,377,492 B1
(45) Date of Patent: Aug. 13, 2019

(54) ILLUMINATING CEILING SYSTEMS AND METHODS FOR AN INTERNAL CABIN OF A VEHICLE

(71) Applicant: THE BOEING COMPANY, Chicago, IL (US)

(72) Inventor: Sunghoon Lee, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/895,044

(22) Filed: Feb. 13, 2018

(51) Int. Cl.
| F21V 21/00 | (2006.01) |
| B64D 11/00 | (2006.01) |
| B60Q 3/47 | (2017.01) |
| B64C 1/06 | (2006.01) |
| B60Q 3/43 | (2017.01) |

(52) U.S. Cl.
CPC ............... *B64D 11/00* (2013.01); *B60Q 3/43* (2017.02); *B60Q 3/47* (2017.02); *B64C 1/066* (2013.01); *B64D 11/003* (2013.01); *B64D 2011/0038* (2013.01)

(58) Field of Classification Search
CPC ... B60Q 3/47; B60Q 3/43; B60Q 3/41; B64D 11/00; B64D 1/003; B64D 2011/0038
USPC ........................................ 362/543, 470, 471
See application file for complete search history.

(56) References Cited

U.S. PATENT DOCUMENTS

| 5,129,597 A * | 7/1992 | Manthey ............... B64D 11/003 244/118.5 |
| 8,814,093 B2 * | 8/2014 | Wuggetzer ............. B64D 11/00 244/118.5 |
| 9,527,437 B2 | 12/2016 | Valentine |
| 2005/0135093 A1 * | 6/2005 | Alexanderson ....... F21V 29/004 362/227 |
| 2007/0109802 A1 * | 5/2007 | Bryan ..................... B64D 11/00 362/471 |
| 2014/0307454 A1 * | 10/2014 | Nisimura ............... B64D 11/00 362/471 |
| 2015/0029736 A1 * | 1/2015 | Aruga ..................... B60Q 3/43 362/471 |
| 2015/0151850 A1 * | 6/2015 | Eakins ................... B64D 47/02 362/471 |
| 2015/0232166 A1 * | 8/2015 | Kircher ................... B64C 1/066 244/119 |
| 2015/0232167 A1 * | 8/2015 | Kircher ................... B64C 1/066 244/119 |
| 2016/0368607 A1 * | 12/2016 | Fehringer .............. B64D 11/00 |

* cited by examiner

*Primary Examiner* — Laura K Tso
(74) *Attorney, Agent, or Firm* — Joseph M. Butscher; The Small Patent Law Group, LLC

(57) ABSTRACT

An illuminating ceiling system for an internal cabin of a vehicle includes a plurality of ceiling panels. Each of the ceiling panels includes a lighting assembly secured to a first portion that overlaps a second portion of adjacent one of the ceiling panels. The lighting assembly is configured to emit light into the internal cabin.

40 Claims, 9 Drawing Sheets

ILLUMINATING CEILING SYSTEMS AND METHODS FOR AN INTERNAL CABIN OF A VEHICLE

FIELD OF EMBODIMENTS OF THE DISCLOSURE

Embodiments of the present disclosure generally relate to ceiling panels within an internal cabin of a vehicle, and, more particularly, to illuminating ceiling systems.

BACKGROUND OF THE DISCLOSURE

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

The internal cabin is typically defined by interior sidewalls that connect to a ceiling and a floor. The sidewalls include windows that allow passengers to see outside of the aircraft. Stowage bins may extend from the ceiling and/or the sidewalls. For example, outboard stowage bins may extend between an outboard sidewall and an outboard portion of the ceiling, while inboard stowage bins may extend downwardly from a portion of the ceiling between aisles of the internal cabin.

Various known ceilings within aircraft are not configured to be adaptively changed. Moreover, certain passengers may find ceilings within aircraft to be aesthetically sterile and plain.

SUMMARY OF THE DISCLOSURE

A need exists for a system and a method of adaptively modifying ceilings within an internal cabin of a vehicle. Further, a need exists for a system and a method that allows for adaptive customization of portions of ceilings within an internal cabin of an aircraft. Additionally, a need exists for an inviting, aesthetically-pleasing ceiling within an internal cabin of an aircraft.

With those needs in mind, certain embodiments of the present disclosure provide an illuminating ceiling system for an internal cabin of a vehicle. The illuminating ceiling system includes a plurality of ceiling panels. Each of the plurality of ceiling panels includes a lighting assembly secured to a first portion that overlaps a second portion of an adjacent one of the plurality of ceiling panels. The lighting assembly is configured to emit light into the internal cabin.

The plurality of ceiling panels may be positioned over at least one aisle within the internal cabin. The plurality of ceiling panels may span between a first column of stowage bin assemblies and a second column of stowage bin assemblies. For example, the first column of stowage bin assemblies may be an outboard column of stowage bin assemblies, and the second column of stowage bin assemblies may be an inboard column of stowage bin assemblies.

In at least one embodiment, the lighting assembly is perpendicularly oriented with respect to a central longitudinal plane of the internal cabin. The plurality of ceiling panels are separate and distinct from passenger service units (PSUs) within the internal cabin.

At least one of the ceiling panels may include at least one light-transmissive indicia. The light assembly is configured to emit the light through light-transmissive indicia.

A lighting control unit may be in communication with the lighting assembly of at least one of the plurality of ceiling panels. The lighting control unit is configured to control operation of the lighting assembly.

In at least one embodiment, the first portion includes an end, and the second portion includes an opposite end. The opposite end may be flat. The end may include a downwardly curved lip having an edge that abuts into an upper surface of the opposite end to vertically offset each of the ceiling panels from an adjacent one of the ceiling panels. A light chamber may be defined between a lower surface of the downwardly curved lip and an upper surface of the opposite end that is overlapped by the downwardly curved lip. In at least one embodiment, the plurality of ceiling panels may upwardly angle and/or curve from an inboard side towards an outboard side.

Certain embodiments of the present disclosure provide an illuminating ceiling method for an internal cabin of a vehicle. The illuminating ceiling method includes providing a plurality of ceiling panels. The providing includes securing a lighting assembly to a first portion of each of the plurality of ceiling panels that overlaps a second portion of an adjacent one of the plurality of ceiling panels. The method also includes emitting light into the internal cabin from the lighting assembly of each of the plurality of ceiling panels.

Certain embodiments of the present disclosure provide a vehicle that includes an internal cabin, and an illuminating ceiling system within the internal cabin, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an illuminating ceiling system within an internal cabin of a vehicle. The illuminating ceiling system includes a ceiling panel having a lighting assembly that is disposed over an aisle of the internal cabin. The ceiling panel may be disposed over the aisle between an outboard stowage bin assembly and an inboard stowage bin assembly. In at least one other embodiment, the ceiling panel may be disposed in relation to an entire axial section of the internal cabin between opposed sidewalls. The lighting assembly may be perpendicularly oriented with respect to a longitudinal plane of the aisle or the internal cabin. The ceiling panel couples to another ceiling panel such that the lighting assembly is positioned over a flat end of the other ceiling panel. Adjacent ceiling panels may be staggered in such fashion. The lighting assembly is secured in an end of the ceiling panel that overlaps an opposite end of another ceiling panel.

The illuminating ceiling systems and methods provide an illusion of light entering from outside of the vehicle (akin to sunlight). Embodiments of the present disclosure provide visually interesting and aesthetically pleasing lighting effects.

As described herein, embodiments of the present disclosure provide an illuminating ceiling system for an internal cabin of a vehicle. The illuminating ceiling system includes a plurality of ceiling panels. Each of the ceiling panels includes a lighting assembly secured to a first portion that overlaps a second portion of an adjacent one of the ceiling panels.

Figure 1:
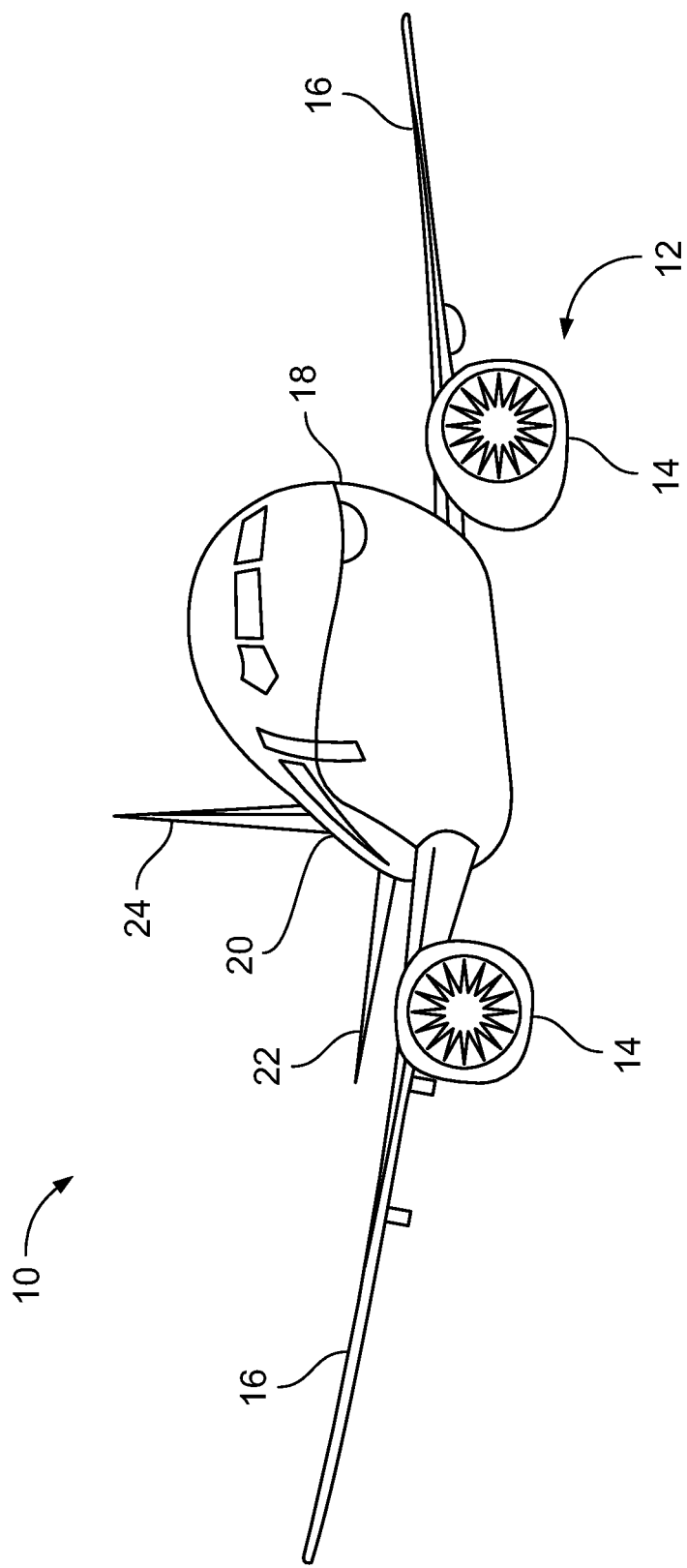
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The ceiling includes a plurality of ceiling panels, as described herein. The internal cabin may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
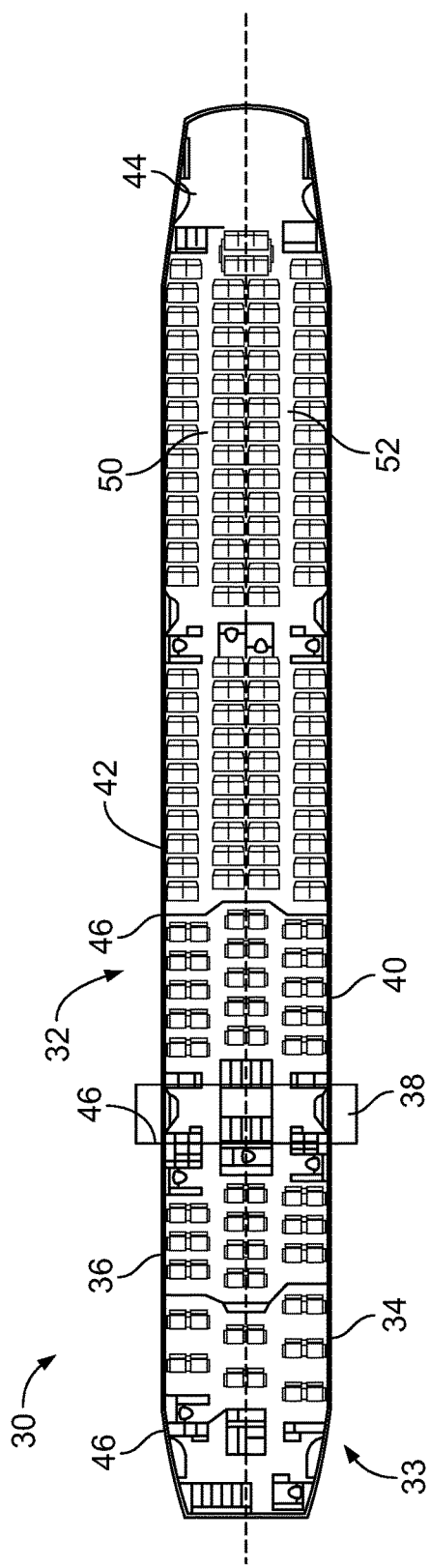
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling (including a plurality of ceiling panels) and a floor.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
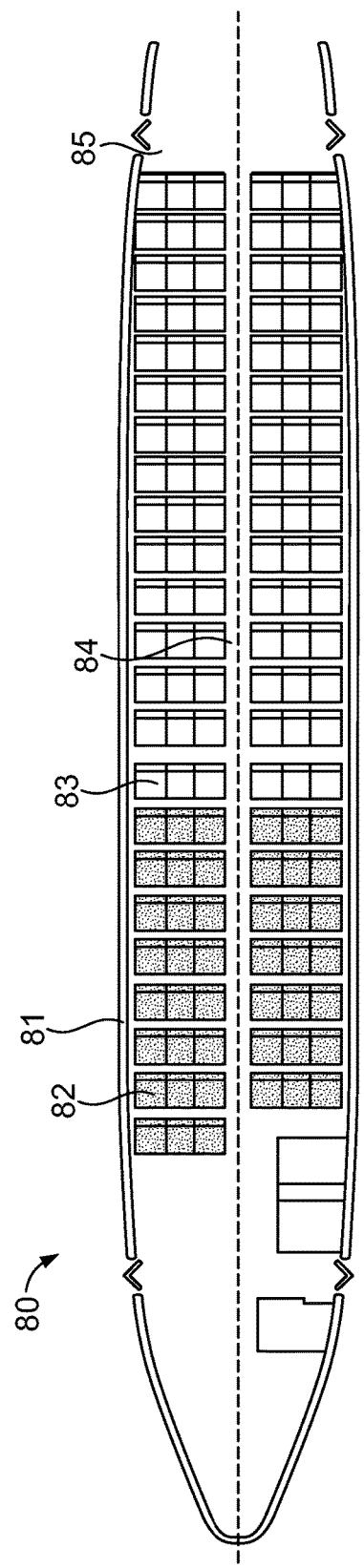
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
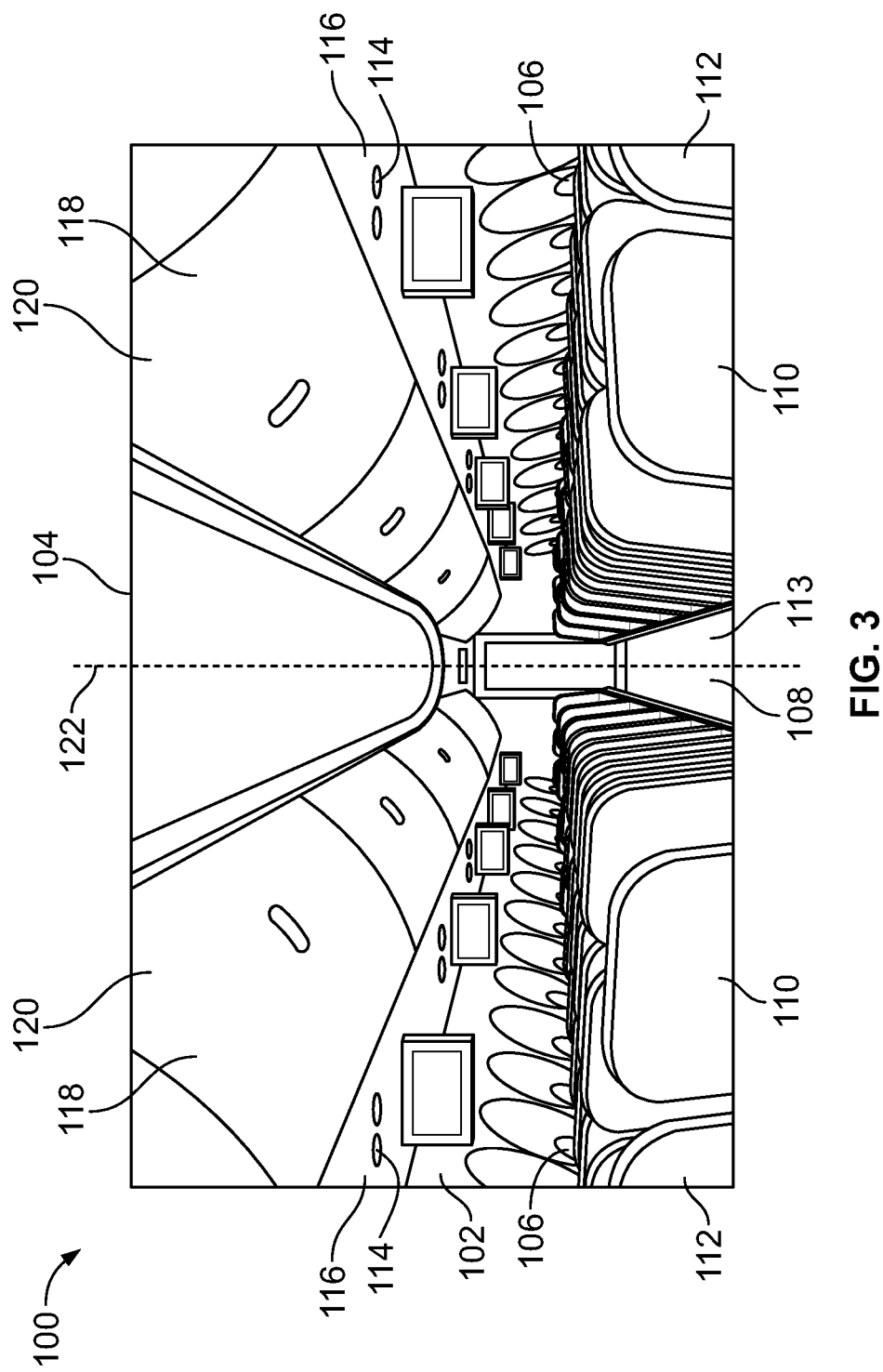
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard sidewalls 102 connected to a ceiling 104. As described herein, the ceiling 104 includes a plurality of ceiling panels. Windows 106 may be formed within the outboard sidewalls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard sidewall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard sidewall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

The internal cabin 100 may include more aisles 113 than shown. Further, the internal cabin 100 may include more or less columns of overhead stowage bin assemblies 118 that shown.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Figure 4:
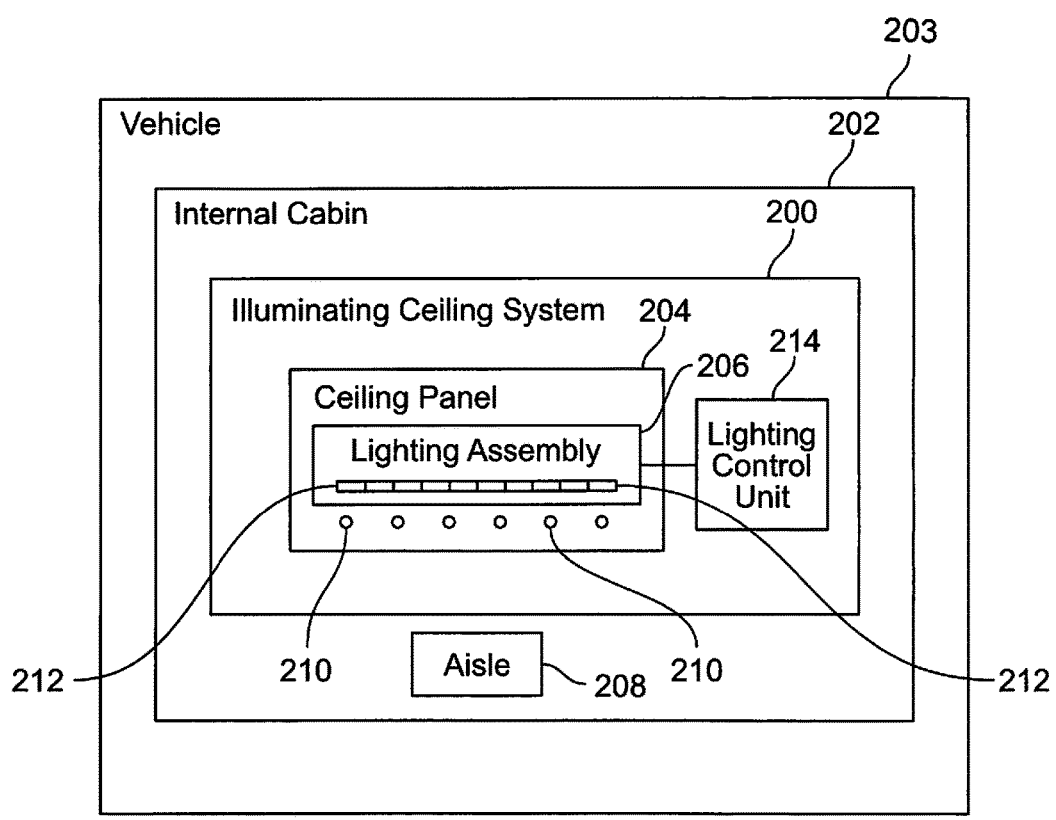
FIG. 4 illustrates a schematic block diagram of an illuminating ceiling within an internal cabin of a vehicle, according to an embodiment of the present disclosure.

FIG. 4 illustrates a schematic block diagram of an illuminating ceiling system 200 within an internal cabin 202 of a vehicle 203, according to an embodiment of the present disclosure. The internal cabin 202 is an example of the internal cabin 100 shown in FIG. 3. The vehicle 203 may be a commercial aircraft, such as the aircraft 10 shown in FIG. 1.

The illuminating ceiling system 200 includes a plurality of ceiling panels 204, although FIG. 4 shows only a single ceiling panel 204. Each ceiling panel 204 includes a lighting assembly 206. The lighting assembly 206 spans across a portion of the internal cabin 202. For example, the lighting assembly 206 may be positioned over and span across an aisle 208 of the internal cabin 202. In at least one other embodiment, the lighting assembly 206 may span across and over an axial section of the internal cabin 202, such as between opposed sidewall panels. The lighting assembly 206 may be orthogonally oriented (such as perpendicularly oriented) to a central longitudinal plane (such as the central longitudinal plane 122 shown in FIG. 3) of the internal cabin 202. The lighting assembly 206 may span between an outboard stowage bin assembly and an inboard (or an opposite outboard) stowage bin assembly.

In at least one embodiment, a fuselage of a vehicle is formed from frames, stringers, skins, and/or the like. The fuselage defines an internal chamber. The ceiling panels 204 are coupled to internal portions of the fuselage that form the internal chamber, and along with sidewall panels, a floor, and the like define the internal cabin 202. That is, the ceiling panels 204 may be decorative structures that secure to an underlying structure, such as portions of the fuselage and/or insulation blankets.

The lighting assembly 206 of each ceiling panel 204 is configured to emit light into the internal cabin 202. For example, the lighting assembly 206 is configured to emit light onto the ceiling panel 204 over the aisle 208.

The lighting assembly 206 may be securely retained within one or more channels formed in the ceiling panel 204. For example, the channel(s) may be a pocket, recess, and/or bracket formed in the ceiling panel 204. The lighting assembly 206 may be secured within the channel through one or more fasteners, adhesives, and/or the like.

In at least one embodiment, the lighting assembly 206 is separate and distinct from a PSU, such as the PSUs 114 shown in FIG. 3. That is, the lighting assembly 206 is separate and distinct from light emitting devices of the PSUs. In at least one embodiment, the lighting assembly 206 is inboard from and/or above the PSU 114.

The lighting assembly 206 may be mounted above a portion of another ceiling panel 204 and configured to emit light through at least one light-transmissive indicia 210 that allow emitted light to pass therethrough. The lighting assemblies 206 are configured to emit light through the light-transmissive indicia 210. Because at least a portion of the lighting assemblies 206 may be positioned above the light-transmissive indicia 210, the lighting assemblies 206 may be configured to backlight the light-transmissive indicia 210. The light-transmissive indicia 210 may be or include one or more of a wayfinding indicia (such as a seat number), text, graphics, and/or the like, such as which may be used for company branding purposes. The illuminating ceiling system 200 may include more or less light-transmissive indicia 210 than shown. In at least one embodiment, the illuminating ceiling system 200 may not include the light-transmissive indicia 210.

The lighting assembly 206 includes one or more light-emitting elements 212, such as light-emitting diodes (LEDs) that are configured to be operated to emit light that may be selectively changed between different colors (such as red-orange-yellow-green-blue-indigo, violet, and mixes of colors therebetween). In at least one embodiment, a single light-emitting element 212 may be used. For example, a single tubular lighting element may be encased in a tubular transparent cover that conforms to a shape of the ceiling panel 204. In at least one other embodiment, multiple light-emitting elements 212 may be used.

The lighting assemblies 206 may be operatively coupled to a lighting control unit 214, such as through one or more wired or wireless connections. The lighting control unit 214 may be secured to one of the ceiling panels 204. Optionally, the lighting control unit 214 may be remotely located from the ceiling panels 204. For example, the lighting control unit 214 may be within another portion of the internal cabin 202, such as within a cockpit, galley station, or the like. The lighting control unit 214 may be in communication with lighting assemblies 206 of a plurality of ceiling panels 204 within the internal cabin 202. Alternatively, the lighting control unit 214 may be in communication with lighting assemblies 206 of only one ceiling panel 204. Examples of lighting assemblies are shown and described in U.S. Pat. No. 9,527,437, entitled "Lighting Assembly for Internal cabin of a Vehicle," which is hereby incorporated by reference in its entirety.

The lighting assemblies 206 may be or include linear portions positioned over the aisle 208. Optionally, the lighting assemblies 206 may be curved, circular, and/or the like. In at least one embodiment, the lighting assemblies 206 include a flexible, transparent housing that retains the plurality of light-emitting elements 212. In this manner, the lighting assembly 206 may conform to the contours of the ceiling panel 204.

In operation, the lighting control unit 214 controls operation of the lighting assemblies 206. For example, an individual may select a color of light to be emitted by the light-emitting element(s) 212, and activate the light-emitting element(s) 212 via an interface coupled to the lighting control unit 214. Light emitted by the lighting assemblies 206 is directed into the internal cabin 202. Further, the emitted light from the lighting assemblies 206 may be emitted through the light-transmissive indicia 210.

Accordingly, the lighting assemblies 206 are used to provide light having desired properties (for example, desired color(s) and effect(s)) into the internal cabin 202. The properties (for example, color, intensity, luminosity, radiance, flickering, timed staggering of light-emitting elements 212 to provide motion effects, and/or the like) of the light may be customized and controlled through the lighting control unit 214.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the lighting control unit 214 may be or include one or more processors that are configured to control operation of the lighting assemblies 206, as described herein.

The lighting control unit 214 is configured to execute a set of instructions that are stored in one or more data storage units or elements (such as one or more memories), in order to process data. For example, the lighting control unit 214 may include or be coupled to one or more memories. The data storage units may also store data or other information as desired or needed. The data storage units may be in the form of an information source or a physical memory element within a processing machine.

The set of instructions may include various commands that instruct the lighting control unit 214 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the lighting control unit 214. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the lighting control unit 214 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
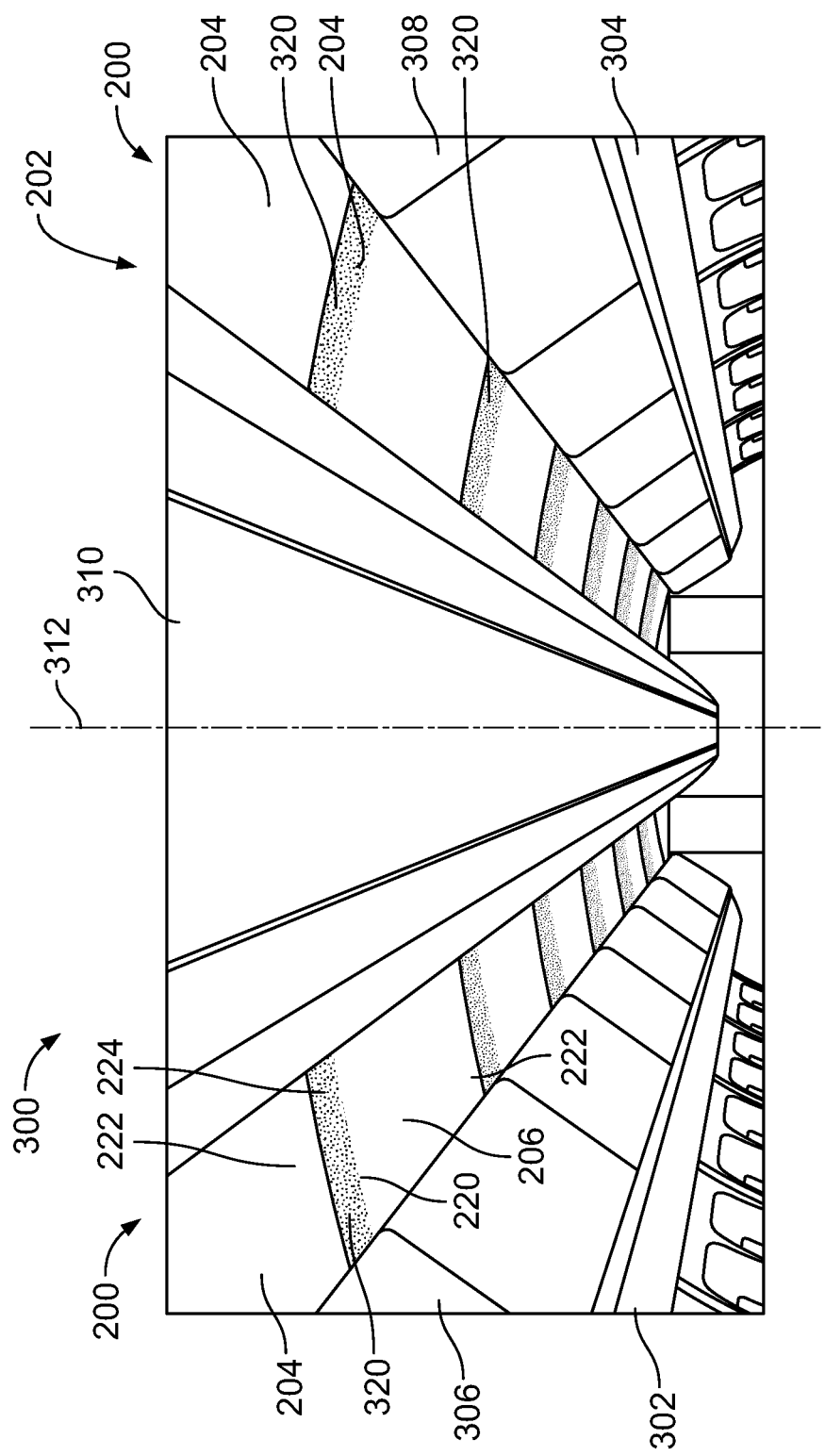
FIG. 5 illustrates a perspective bottom view of a ceiling of an internal cabin, according to an embodiment of the present disclosure.

FIG. 5 illustrates a perspective bottom view of a ceiling 300 of an internal cabin 202, according to an embodiment of the present disclosure. The ceiling 300 spans between a first outboard sidewall 302 and a second outboard sidewall 304 that is opposite from the first outboard sidewall 302. A column of outboard stowage bin assemblies 306 extend between the first outboard sidewall 302 and the ceiling 300. A column of outboard stowage bin assemblies 308 extend between the second outboard sidewall 304 and the ceiling 300. A central column of inboard stowage bin assemblies 310 extend downwardly from the ceiling 300. The stowage bin assemblies 310 may be longitudinally aligned with a central longitudinal plane 312 of the internal cabin 202. Alternatively, the internal cabin 202 may not include the central column of stowage bin assemblies 310.

The ceiling 300 includes the illuminating ceiling system 200 having a plurality of overlapping ceiling panels 204. As shown, the illuminating ceiling system 200 may include two parallel columns of overlapping ceiling panels 204. Optionally, the illuminating ceiling system may include a single column of overlapping ceiling panels 204 (such as in the absence of the central column of stowage bin assemblies 310).

Each ceiling panel 204 includes a main body 220 having a first end 222 connected to an opposite second end 224. The first end 222 of one ceiling panel 204 is overlapped by a second end 224 of an adjacent ceiling panel 204. The lighting assemblies 206 may be secured to the second ends 224, such that the lighting assemblies 206 (shown in FIG. 4) are disposed within a light chamber (for example, a formed gap) between the first ends 222 and the second ends 224. Optionally, the first end may be considered the second end, and vice versa. The lighting assembly 206 is secured to a portion of the ceiling panel 204, such as the end 224.

Referring to FIGS. 4 and 5, the lighting assemblies 206 emit light 320 that in a cross-wise direction into the internal cabin 202. The light 320 may be emitted onto portions of the ceiling panels 204. The lighting assemblies 206 may be positioned over aisles 208 within the internal cabin 202, or over an axial section of the internal cabin 202. The lighting assemblies 206 may be orthogonally oriented (such as perpendicular) in relation to the central longitudinal plane 312.

Figure 6:
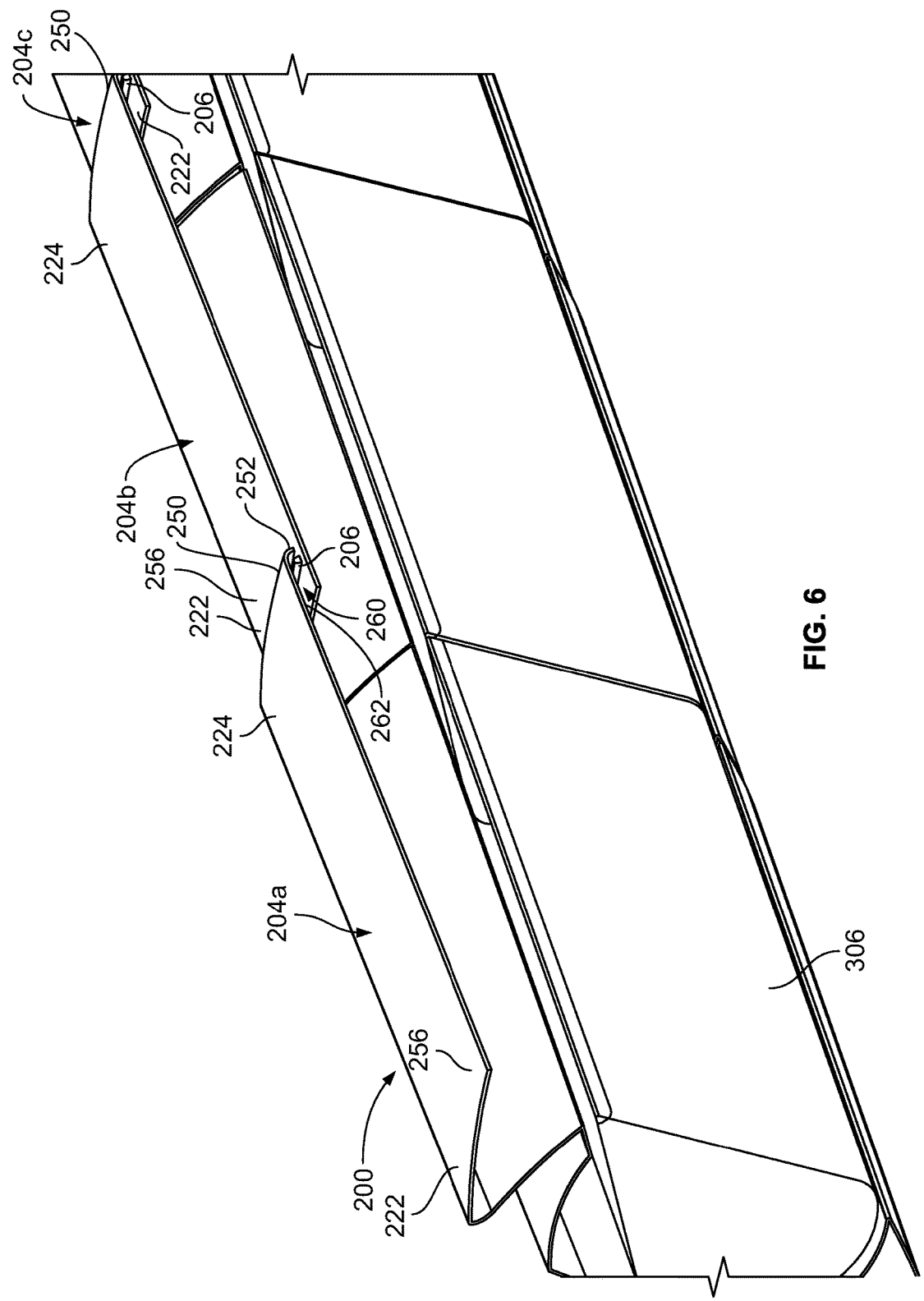
FIG. 6 illustrates a perspective lateral cross-sectional view of an illuminating ceiling system, according to an embodiment of the present disclosure.
Figure 7:
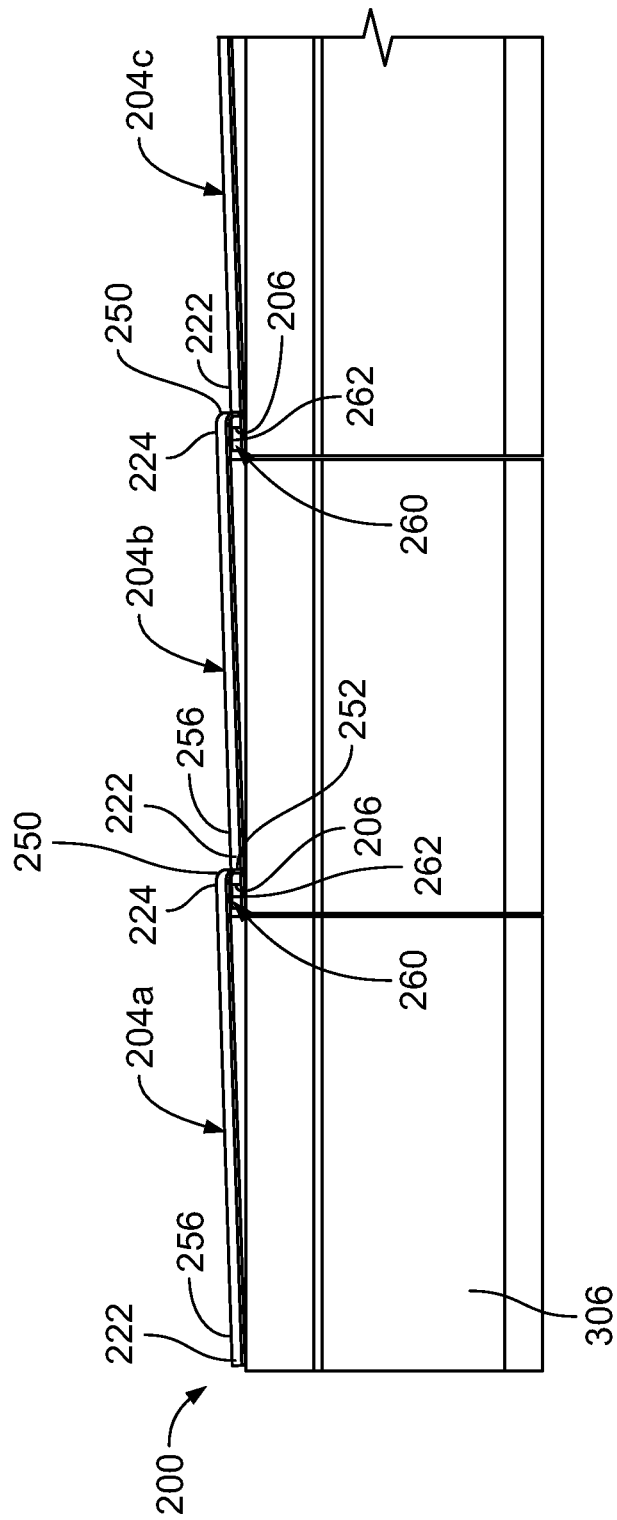
FIG. 7 illustrates a lateral cross-sectional view of an illuminating ceiling system, according to an embodiment of the present disclosure.

FIG. 6 illustrates a perspective lateral cross-sectional view of the illuminating ceiling system 200, according to an embodiment of the present disclosure. FIG. 7 illustrates a lateral cross-sectional view of the illuminating ceiling system 200. Referring to FIGS. 6 and 7, the illuminating system 200 may include ceiling panels 204a, 204b, and 204c. The first end 222 of the ceiling panel 204b is overlapped by the second end 224 of the ceiling panel 204a, while the first end 222 of the ceiling panel 204c is overlapped by the second end 224 of the ceiling panel 204b, and so on. The first ends 222 may be fore ends (that is, oriented towards a fore or front of the internal cabin 204, shown in FIG. 5), while the second ends 224 may be aft ends (that is, oriented towards an aft or rear of the internal cabin 204).

The first end 222 may be generally flat. The second end 224 may include a downwardly curved lip 250 having an edge 252 that abuts into an upper surface 256 of an adjacent first end 222. For example, the edge 252 of the ceiling panel 204a abuts into the upper surface 256 of the ceiling panel 204b, thereby vertically offsetting the second end 224 of the ceiling panel 204a from the first end 222 of the ceiling panel 204b. A light chamber 260 is defined between a lower surface 262 of the second end 224 of the ceiling panel 204a and the upper surface 256 of the first end 222 of the ceiling panel 204b that is overlapped by the second end 224 of the ceiling panel 204a. For example, the light chamber 260 may be defined between the lower surface 262 of the downwardly curved lip 250 and the upper surface 256 of the opposite end 222 that is overlapped by the downwardly curved lip 250. The lighting assembly 206 of the ceiling panel 204a is secured within the curved lip 250, which may form a retaining pocket, bracket, or the like that is configured to securely retain the lighting assembly 206. The other ceiling panels 204, such as the ceiling panel 204c, are configured in a similar manner. In operation, the lighting assemblies 206 emit light, which is directed out of the light chamber 260 (for example, by the lower surfaces 262 and the upper surfaces 256 overlapped by the lower surfaces 262) into the internal cabin 204.

Figure 8:
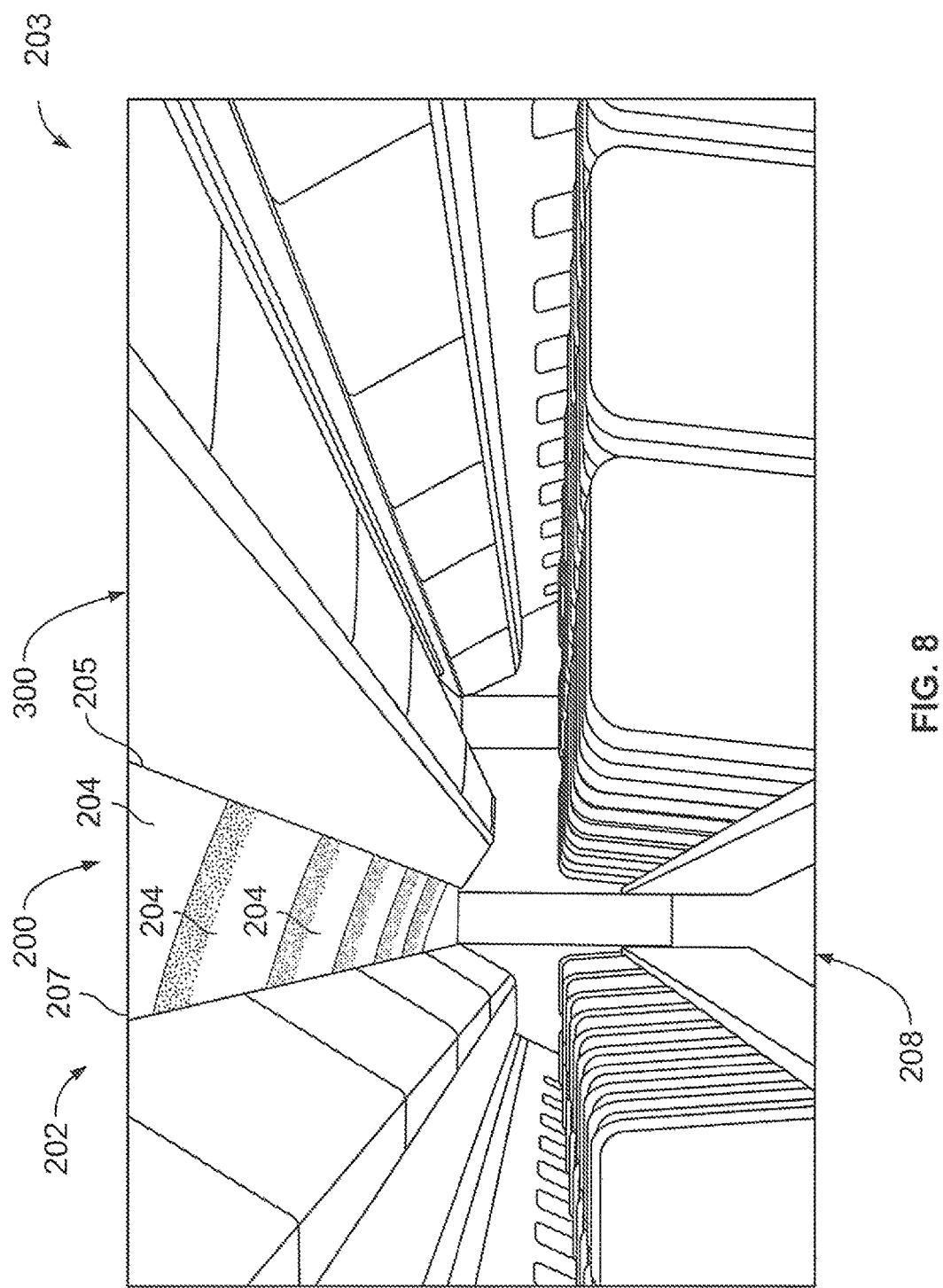
FIG. 8 illustrates a perspective view of an internal cabin of a vehicle, according to an embodiment of the present disclosure.

FIG. 8 illustrates a perspective view of the internal cabin 202 of the vehicle 203, according to an embodiment of the present disclosure. The internal cabin 202 includes the ceiling 300. The ceiling 300 includes the illuminating ceiling system 200, which includes a plurality of overlapping ceiling panels 204, as described herein. As shown, the ceiling panels 204 may be oriented laterally upward towards an outboard side. That is, the ceiling panels 204 may upwardly angle and/or curve from an inboard side 205 towards an outboard side 207. Alternatively, the ceiling panels may downwardly angle and/or curve from the inboard side 205 towards the outboard side 207.

Figure 9:
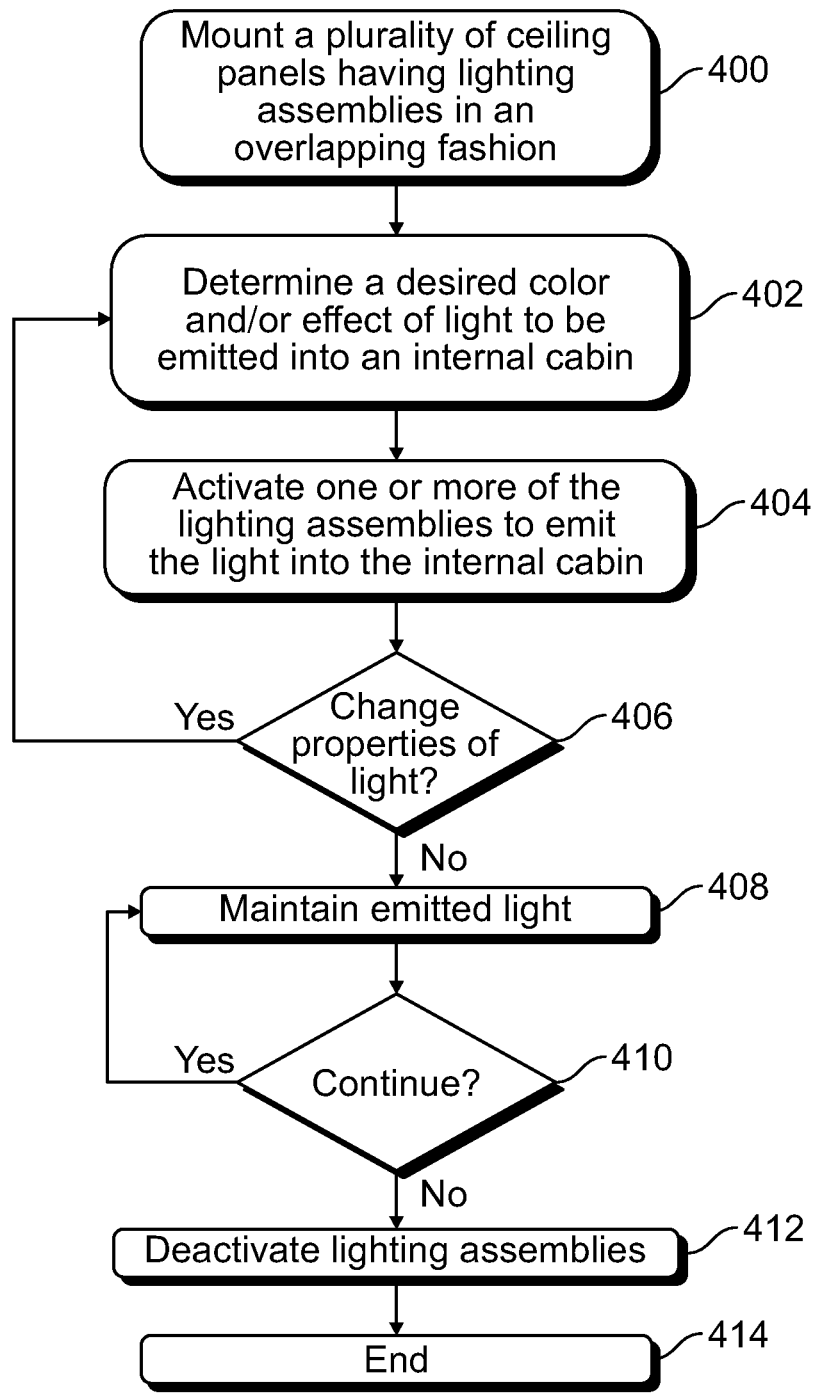
FIG. 9 illustrates a flow chart of a method of operating an illuminating ceiling system, according to an embodiment of the present disclosure.

FIG. 9 illustrates a flow chart of a method of operating an illuminating ceiling system, according to an embodiment of the present disclosure. Referring to FIGS. 4-9, the method begins at 400, at which a plurality of ceiling panels 204 having lighting assemblies 206 are mounted in an overlapping fashion. At 402, one or more desired properties (such as colors, effects, staggering, staging, and/or the like) of light to be emitted into the internal cabin 202 are determined. At 404, the lighting assemblies 206 are activated to emit the light 320 into the internal cabin 202.

At 406, it is determined whether or not to change the properties of the light. If one or more of the properties are to be changed, the method returns to 402. If, however, the properties of the light 320 are to be maintained, the method proceeds from 406 to 408, at which the emitted light 320 is maintained. At 410, it is determined whether or not to continue emitting the light 320. If the emission of the light 320 is to continue, the method returns to 408. If, however, the emission of the light 320 is to cease, the method proceeds from 410 to 412, at which the lighting assemblies 412 are deactivated, and the method ends at 414.

As described herein, embodiments of the present disclosure provide systems and methods of adaptively modifying ceilings within an internal cabin of a vehicle. Further, embodiments of the present disclosure provide systems and methods that allow for adaptive customization of portions of ceilings within an internal cabin of an aircraft. Additionally, embodiments of the present disclosure provide inviting, aesthetically-pleasing ceilings within internal cabins of vehicles.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An illuminating ceiling system for an internal cabin of a vehicle, the illuminating ceiling system comprising:
   a plurality of ceiling panels, wherein each of the plurality of ceiling panels includes a lighting assembly secured to a first portion including an end that overlaps a second portion including an opposite end of an adjacent one of the plurality of ceiling panels, wherein the lighting assembly is configured to emit light into the internal cabin,
   wherein the opposite end is flat, and wherein the end comprises a downwardly curved lip having an edge that abuts into an upper surface of the opposite end to vertically offset each of the ceiling panels from an adjacent one of the ceiling panels.

2. The illuminating ceiling system of claim 1, wherein the plurality of ceiling panels are positioned over at least one aisle within the internal cabin.

3. The illuminating ceiling system of claim 1, wherein the plurality of ceiling panels span between a first column of stowage bin assemblies and a second column of stowage bin assemblies.

4. The illuminating ceiling system of claim 3, wherein the first column of stowage bin assemblies is an outboard column of stowage bin assemblies, and the second column of stowage bin assemblies is an inboard column of stowage bin assemblies.

5. The illuminating ceiling system of claim 1, wherein the lighting assembly is perpendicularly oriented with respect to a central longitudinal plane of the internal cabin.

6. The illuminating ceiling system of claim 1, wherein the plurality of ceiling panels are separate and distinct from passenger service units (PSUs) within the internal cabin.

7. The illuminating ceiling system of claim 1, wherein at least one of the plurality of ceiling panels comprises at least one light-transmissive indicia, and wherein the light assembly is configured to emit the light through the at least one light-transmissive indicia.

8. The illuminating ceiling system of claim 1, further comprising a lighting control unit in communication with the lighting assembly of at least one of the plurality of ceiling panels, wherein the lighting control unit is configured to control operation of the lighting assembly.

9. The illuminating ceiling system of claim 1, wherein a light chamber is defined between a lower surface of the downwardly curved lip and an upper surface of the opposite end that is overlapped by the downwardly curved lip.

10. The illuminating ceiling system of claim 1, wherein the plurality of ceiling panels one or both of upwardly angle or curve from an inboard side towards an outboard side.

11. An illuminating ceiling method for an internal cabin of a vehicle, the illuminating ceiling method comprising:
providing a plurality of ceiling panels, wherein the providing comprises securing a lighting assembly to a first portion of each of the plurality of ceiling panels that overlaps a second portion of an adjacent one of the plurality of ceiling panels, wherein the first portion is an end, and wherein the second portion is an opposite end, wherein the opposite end is flat, and wherein the end comprises a downwardly curved lip having an edge that abuts into an upper surface of the opposite end to vertically offset each of the ceiling panels from an adjacent one of the ceiling panels; and
emitting light into the internal cabin from the lighting assembly of each of the plurality of ceiling panels.

12. The illuminating ceiling method of claim 11, further comprising positioning the plurality of ceiling panels over at least one aisle within the internal cabin.

13. The illuminating ceiling method of claim 11, further comprising perpendicularly orienting the lighting assembly with respect to a central longitudinal plane of the internal cabin.

14. The illuminating ceiling method of claim 11, wherein the emitting comprises emitting the light through the at least one light-transmissive indicia of the adjacent one of the plurality of ceiling panels.

15. The illuminating ceiling method of claim 11, further comprising controlling operation of the lighting assembly of at least one of the plurality of ceiling panels with a lighting control unit.

16. The illuminating ceiling system of method 11, wherein a light chamber is defined between a lower surface of the downwardly curved lip and an upper surface of the opposite end that is overlapped by the downwardly curved lip.

17. A vehicle comprising:
an internal cabin; and
an illuminating ceiling system within the internal cabin, the illuminating ceiling system comprising:
a plurality of ceiling panels, wherein each of the ceiling panels includes a lighting assembly secured to an end that overlaps an opposite end of an adjacent one of the ceiling panels, wherein the opposite end is flat, and wherein the end comprises a downwardly curved lip having an edge that abuts into an upper surface of the opposite end to vertically offset each of the ceiling panels from an adjacent one of the ceiling panels, wherein a light chamber is defined between a lower surface of the downwardly curved lip and an upper surface of the opposite end that is overlapped by the downwardly curved lip, wherein the lighting assembly is configured to emit light into the internal cabin, wherein the plurality of ceiling panels are positioned over at least one aisle within the internal cabin, wherein the lighting assembly is perpendicularly oriented with respect to a central longitudinal plane of the internal cabin; and
a lighting control unit in communication with the lighting assembly of at least one of the plurality of ceiling panels, wherein the lighting control unit is configured to control operation of the lighting assembly.

18. An illuminating ceiling system for an internal cabin of a vehicle, the illuminating ceiling system comprising:
a plurality of ceiling panels, wherein each of the plurality of ceiling panels includes a lighting assembly secured to a first portion that overlaps a second portion of an adjacent one of the plurality of ceiling panels, wherein the lighting assembly is configured to emit light into the internal cabin,
wherein the lighting assembly is perpendicularly oriented with respect to a central longitudinal plane of the internal cabin.

19. The illuminating ceiling system of claim 18, wherein the plurality of ceiling panels are positioned over at least one aisle within the internal cabin.

20. The illuminating ceiling system of claim 18, wherein the plurality of ceiling panels span between a first column of stowage bin assemblies and a second column of stowage bin assemblies.

21. The illuminating ceiling system of claim 20, wherein the first column of stowage bin assemblies is an outboard column of stowage bin assemblies, and the second column of stowage bin assemblies is an inboard column of stowage bin assemblies.

22. The illuminating ceiling system of claim 18, wherein the plurality of ceiling panels are separate and distinct from passenger service units (PSUs) within the internal cabin.

23. The illuminating ceiling system of claim 18, wherein at least one of the plurality of ceiling panels comprises at least one light-transmissive indicia, and wherein the light assembly is configured to emit the light through the at least one light-transmissive indicia.

24. The illuminating ceiling system of claim 18, further comprising a lighting control unit in communication with the lighting assembly of at least one of the plurality of ceiling panels, wherein the lighting control unit is configured to control operation of the lighting assembly.

25. The illuminating ceiling system of claim 18, wherein the plurality of ceiling panels one or both of upwardly angle or curve from an inboard side towards an outboard side.

26. An illuminating ceiling system for an internal cabin of a vehicle, the illuminating ceiling system comprising:
   a plurality of ceiling panels, wherein each of the plurality of ceiling panels includes a lighting assembly secured to a first portion that overlaps a second portion of an adjacent one of the plurality of ceiling panels, wherein the lighting assembly is configured to emit light into the internal cabin,
   wherein at least one of the plurality of ceiling panels comprises at least one light-transmissive indicia, and wherein the light assembly is configured to emit the light through the at least one light-transmissive indicia.

27. The illuminating ceiling system of claim 26, wherein the plurality of ceiling panels are positioned over at least one aisle within the internal cabin.

28. The illuminating ceiling system of claim 26, wherein the plurality of ceiling panels span between a first column of stowage bin assemblies and a second column of stowage bin assemblies.

29. The illuminating ceiling system of claim 28, wherein the first column of stowage bin assemblies is an outboard column of stowage bin assemblies, and the second column of stowage bin assemblies is an inboard column of stowage bin assemblies.

30. The illuminating ceiling system of claim 28, wherein the plurality of ceiling panels are separate and distinct from passenger service units (PSUs) within the internal cabin.

31. The illuminating ceiling system of claim 28, further comprising a lighting control unit in communication with the lighting assembly of at least one of the plurality of ceiling panels, wherein the lighting control unit is configured to control operation of the lighting assembly.

32. The illuminating ceiling system of claim 28, wherein the plurality of ceiling panels one or both of upwardly angle or curve from an inboard side towards an outboard side.

33. An illuminating ceiling method for an internal cabin of a vehicle, the illuminating ceiling method comprising:
   providing a plurality of ceiling panels, wherein the providing comprises securing a lighting assembly to a first portion of each of the plurality of ceiling panels that overlaps a second portion of an adjacent one of the plurality of ceiling panels;
   perpendicularly orienting the lighting assembly with respect to a central longitudinal plane of the internal cabin; and
   emitting light into the internal cabin from the lighting assembly of each of the plurality of ceiling panels.

34. The illuminating ceiling method of claim 33, further comprising positioning the plurality of ceiling panels over at least one aisle within the internal cabin.

35. The illuminating ceiling method of claim 33, further comprising perpendicularly orienting the lighting assembly with respect to a central longitudinal plane of the internal cabin.

36. The illuminating ceiling method of claim 33, wherein the emitting comprises emitting the light through the at least one light-transmissive indicia of the adjacent one of the plurality of ceiling panels.

37. The illuminating ceiling method of claim 33, further comprising controlling operation of the lighting assembly of at least one of the plurality of ceiling panels with a lighting control unit.

38. An illuminating ceiling method for an internal cabin of a vehicle, the illuminating ceiling method comprising:
   providing a plurality of ceiling panels, wherein the providing comprises securing a lighting assembly to a first portion of each of the plurality of ceiling panels that overlaps a second portion of an adjacent one of the plurality of ceiling panels; and
   emitting light into the internal cabin from the lighting assembly of each of the plurality of ceiling panels, wherein the emitting comprises emitting the light through the at least one light-transmissive indicia of the adjacent one of the plurality of ceiling panels.

39. The illuminating ceiling method of claim 38, further comprising positioning the plurality of ceiling panels over at least one aisle within the internal cabin.

40. The illuminating ceiling method of claim 38, further comprising controlling operation of the lighting assembly of at least one of the plurality of ceiling panels with a lighting control unit.

* * * * *